US010600087B2

(12) United States Patent
Kannan et al.

(10) Patent No.: US 10,600,087 B2
(45) Date of Patent: Mar. 24, 2020

(54) TECHNIQUES FOR FACILITATING CONTENT RETARGETING

(71) Applicant: Microsoft Technology Licensing, LLC, Redmond, WA (US)

(72) Inventors: Ashvin Kannan, Sunnyvale, CA (US); Gyanda Sachdeva, Mountain View, CA (US); Michael Grishaver, Portola Valley, CA (US); Huining Feng, Dublin, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 14/032,964

(22) Filed: Sep. 20, 2013

(65) Prior Publication Data

US 2015/0066654 A1   Mar. 5, 2015

Related U.S. Application Data

(60) Provisional application No. 61/872,503, filed on Aug. 30, 2013.

(51) Int. Cl.
  *G06Q 30/02*   (2012.01)
  *H04N 21/00*   (2011.01)
  (Continued)

(52) U.S. Cl.
  CPC ..... *G06Q 30/0269* (2013.01); *G06Q 30/0241* (2013.01); *G06Q 30/0251* (2013.01);
  (Continued)

(58) Field of Classification Search
  CPC .......... G06Q 30/0267; G06Q 30/0271; G06Q 30/0241; G06Q 30/0251; G06Q 30/0269;
  (Continued)

(56) References Cited

U.S. PATENT DOCUMENTS 7,631,008 B2 * 12/2009 Carson et al. ............. 705/14.45
2007/0050257 A1 * 3/2007 Fine et al. ...................... 705/14
(Continued)

OTHER PUBLICATIONS

"Measuring the effectiveness of online advertising", Study conducted by PwC for IAB France and the SRI, Jan. 2011.*
(Continued)

*Primary Examiner* — Raquel Alvarez
(74) *Attorney, Agent, or Firm* — Schwegman Lundberg & Woessner, P.A.

(57) ABSTRACT

Techniques for facilitating retargeting of content are described. According to various embodiments, a user specification of a first set of content items and a second set of content items may be received. Moreover, a user specification of flow logic information may be received. The flow logic information may specify a user trigger action, and an instruction that a second content item in the second set is only to be displayed to a particular user after it is determined that the particular user has performed the user trigger action on the first content item. Thereafter, it may be determined that the particular user has performed the user trigger action on the first content item, and the second content item may be displayed to the particular user, based on the flow logic information.

18 Claims, 15 Drawing Sheets

(51) Int. Cl.
*H04N 21/482* (2011.01)
*H04N 21/4784* (2011.01)

(52) U.S. Cl.
CPC ..... *G06Q 30/0255* (2013.01); *G06Q 30/0267* (2013.01); *G06Q 30/0271* (2013.01); *H04N 21/4784* (2013.01); *H04N 21/482* (2013.01)

(58) Field of Classification Search
CPC ............ G06Q 30/0255; H04N 21/482; H04N 21/4784
USPC ........... 705/14.64, 14.67, 14.4, 14.49, 14.66, 705/14.53; 725/23
See application file for complete search history.

(56) References Cited

U.S. PATENT DOCUMENTS

| | | | |
|---|---|---|---|
| 2008/0077478 A1* | 3/2008 | Kim | 705/10 |
| 2009/0106100 A1* | 4/2009 | Mashinsky | 705/14 |
| 2011/0066501 A1* | 3/2011 | Saxena | 705/14.64 |
| 2012/0010952 A1* | 1/2012 | Ramer et al. | 705/14.46 |
| 2012/0059716 A1* | 3/2012 | Agarwal et al. | 705/14.52 |
| 2012/0215639 A1* | 8/2012 | Ramer et al. | 705/14.53 |
| 2012/0226564 A1* | 9/2012 | Mirrokni Banadaki et al. | 705/14.66 |
| 2012/0265588 A1* | 10/2012 | Kannan et al. | 705/14.4 |
| 2012/0272256 A1* | 10/2012 | Bedi | 725/5 |
| 2012/0284108 A1* | 11/2012 | Fontana | G06Q 50/01 705/14.27 |
| 2013/0066706 A1* | 3/2013 | Wu et al. | 705/14.42 |
| 2013/0110636 A1* | 5/2013 | Bott | 705/14.64 |
| 2013/0124327 A1* | 5/2013 | Doughty et al. | 705/14.64 |
| 2013/0144720 A1* | 6/2013 | Hari et al. | 705/14.55 |
| 2013/0144729 A1* | 6/2013 | Jones et al. | 705/14.73 |
| 2013/0151603 A1* | 6/2013 | Lobb et al. | 709/204 |
| 2013/0159112 A1* | 6/2013 | Schultz et al. | 705/14.66 |
| 2013/0211923 A1* | 8/2013 | Yuill et al. | 705/14.72 |
| 2013/0226690 A1* | 8/2013 | Gross | 705/14.41 |
| 2013/0227482 A1* | 8/2013 | Thorsander et al. | 715/821 |
| 2013/0232011 A1* | 9/2013 | Gupta et al. | 705/14.64 |
| 2013/0246187 A1* | 9/2013 | Chau et al. | 705/14.66 |
| 2013/0254023 A1* | 9/2013 | Krantz et al. | 705/14.49 |
| 2013/0268354 A1* | 10/2013 | Jayaram | 705/14.49 |
| 2013/0268373 A1* | 10/2013 | Grishaver | 705/14.67 |
| 2013/0282519 A1* | 10/2013 | Xavier et al. | 705/26.7 |
| 2013/0290106 A1* | 10/2013 | Bradley et al. | 705/14.64 |
| 2013/0304581 A1* | 11/2013 | Soroca et al. | 705/14.64 |
| 2013/0332283 A1* | 12/2013 | Faith et al. | 705/14.64 |
| 2014/0164401 A1* | 6/2014 | Kyaw et al. | 707/751 |

OTHER PUBLICATIONS

James G. Shanahan and Goutham Kurra, "The Information Retrieval Series, Chapter 9 Digital Advertising: An Information Scientist's Perspective", Springer, Jun. 2011.*
Johnston, Michael, How to Sell Display Ads: CPM vs. CPC vs. CPA, Jun. 2013.*
Johnston, Michael, "How to Sell Display Ads: CPM vs. CPC vs. CPA", Jun. 13, 2013, Monetize Pros.*

* cited by examiner

Set Target Audience — 1100

Age:

Gender:

Location:

Skills:

Current/Previous Employer:

Size of Employer:

Position/Job:

Seniority:

Current/previous school:

Education:

Interests:

No. of Connections:

...

Submit    Cancel

*Fig. 11*

TECHNIQUES FOR FACILITATING CONTENT RETARGETING

RELATED APPLICATIONS

This patent application claims the benefit of priority to U.S. Provisional Patent Application Ser. No. 61/872,503, filed on Aug. 30, 2013, which is incorporated herein by reference in its entirety.

TECHNICAL FIELD

The present application relates generally to data processing systems and, in one specific example, to techniques for facilitating retargeting of content.

BACKGROUND

Online advertising has become an extremely popular and successful technique for organizations to advertise their products or services to users. Online advertising has also become a major source of revenue for various online platforms and webpages that hold such advertisements. Online advertising generally involves the placement of advertisements on webpages, where advertisers typically pay based on a number of impressions/views or number of clicks that an advertisement may receive.

BRIEF DESCRIPTION OF THE DRAWINGS

Some embodiments are illustrated by way of example and not limitation in the figures of the accompanying drawings in which:

FIG. 11 illustrates an exemplary portion of a user interface for specifying targeting criteria, according to various embodiments;

DETAILED DESCRIPTION

Example methods and systems for retargeting content are described. In the following description, for purposes of explanation, numerous specific details are set forth in order to provide a thorough understanding of example embodiments. It will be evident, however, to one skilled in the art that the present invention may be practiced without these specific details.

According to various exemplary embodiments described herein, a system enables an advertiser to specify the order in which content items are to be displayed to a user. For example, the system may display a user interface that enables an advertiser to specify that a first piece of content is to be displayed to a user, and that a second piece of content is to be displayed to the user after that user interacts in a particular way with the first piece of content. For instance, an advertiser may utilize the system to display an advertisement to a user only after the user interacts in a particular way (e.g., views, clicks, likes, shares, follows, comments, etc.) with another advertisement or a news article, publication, blog post, or review associated with the company.

Figure 1:
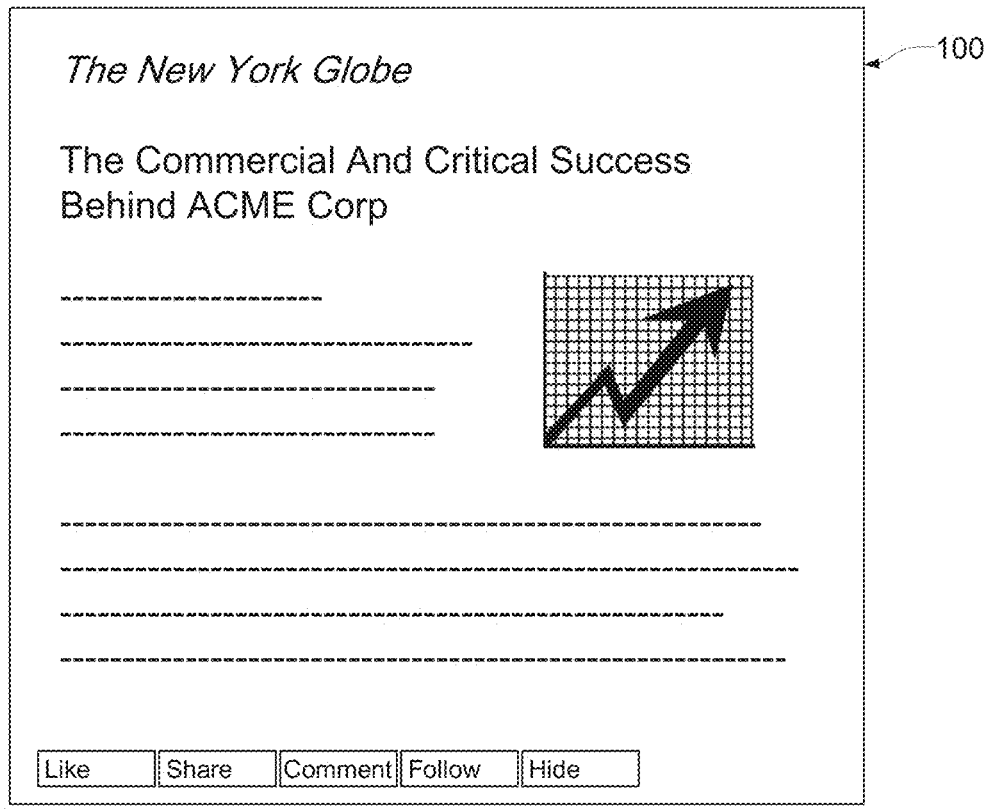
FIG. 1 illustrates non-limiting examples of different types of content items, according to various embodiments.
Figure 1:

Accordingly, the system described herein may be utilized to conduct highly strategic and sophisticated advertising and marketing campaigns. For example, conventional advertising campaigns often involve immediately displaying advertisements for a company's products directly to a user, without regard to whether the user has been exposed to any other content describing that company or its products. In contrast, the system described herein may implement an advertising strategy of first introducing a user to a company and its products, employees, goals, success, commitment to various causes, and so on, in order to generate brand recognition, goodwill, and a positive impression of the company from the point of view of users. This may be accomplished by the system displaying content items that broadly or generally describe various aspects of the company. Examples of such content items include news articles, publications, blog posts, and reviews describing various aspects of the company, which may be generated by the company itself or by independent sources. For example, FIG. 1 illustrates an example of a news article 100 from a newspaper that portrays the fictional Acme Corporation in a positive light, by describing reasons behind the current commercial and critical success of the Acme Corporation.

After a user has been broadly exposed to the company and its products at a general level, the system can display other content that is more narrowly focused on sales or specific products items offered by the company, such as advertisements, deals, coupons, promotions, etc., for products. For example, FIG. 1 illustrates an example of an advertisement 101 for various products offered by the Acme Corporation. Accordingly, a higher rate of conversion from the display of advertisements may be achieved, because the advertisements may be targeted at (1) users that have already been exposed to the company or its products (as evidenced by, for example, the user viewing or clicking on news articles, publications, blog posts, and reviews describing the company and its products) and (2) users that have already demonstrated some level of interest in the company and its products (as evidenced by, for example, the user liking, sharing, following or commenting on news articles, publications, blog posts, and reviews describing the company and its products).

Accordingly, the tools and user interfaces described herein allow an advertiser to efficiently and easily create "storyboards" for an advertising or marketing campaign in advance, possibly before a single advertisement is ever displayed to a user. For example, at the time when an advertiser is specifying that a first content item is to be displayed, the advertiser may also specify that a second content item is to be displayed after the user interacts with the first content item in a particular way. Such a specification from the advertiser may be received well in advance of the actual display of either the first or second content items.

The system herein may also be utilized to implement a "funnel" advertising and marketing strategy, whereby a large number of users viewing different types of generalized content regarding a company are ultimately directed towards a highly specific advertisement for product items offered by that company. For example, the system may display a wide range of content items that generally pertain to a company, and then display a smaller range of content items having an intermediate level of specificity pertaining to the company and its products, and then display a very small range of highly specific advertisements for product items provided by the company.

While some embodiments may involve first displaying content items generally describing a company, a product campaign, a product line, or a product item, and so on, followed by specific content items related to product items offered by the company, in other embodiments, the specific content items may be displayed first, before the more general content items are displayed. For example, initially advertisements for specific products offered by a company may be displayed to users likely to be interested in these specific products. Thereafter, if the users engage positively with this content, more generalized content describing other aspects of the company may be displayed, in order to expose the user to other products provided by the company, and to cultivate and leverage brand loyalty to the company as a whole.

Various embodiments, examples, and figures herein refer to tools, systems, and user interfaces that may be utilized by advertisers. However, references herein to advertisers are merely exemplary, and it is understood that the tools, systems, and user interfaces herein may be utilized by any person or organization seeking to adjust the display of content items to users, including advertisers, marketers, product relations specialists, employees and executives of organizations seeking to advertise, employees and executives of organizations that assist customers in the display of advertisements, and so on.

Figure 2:
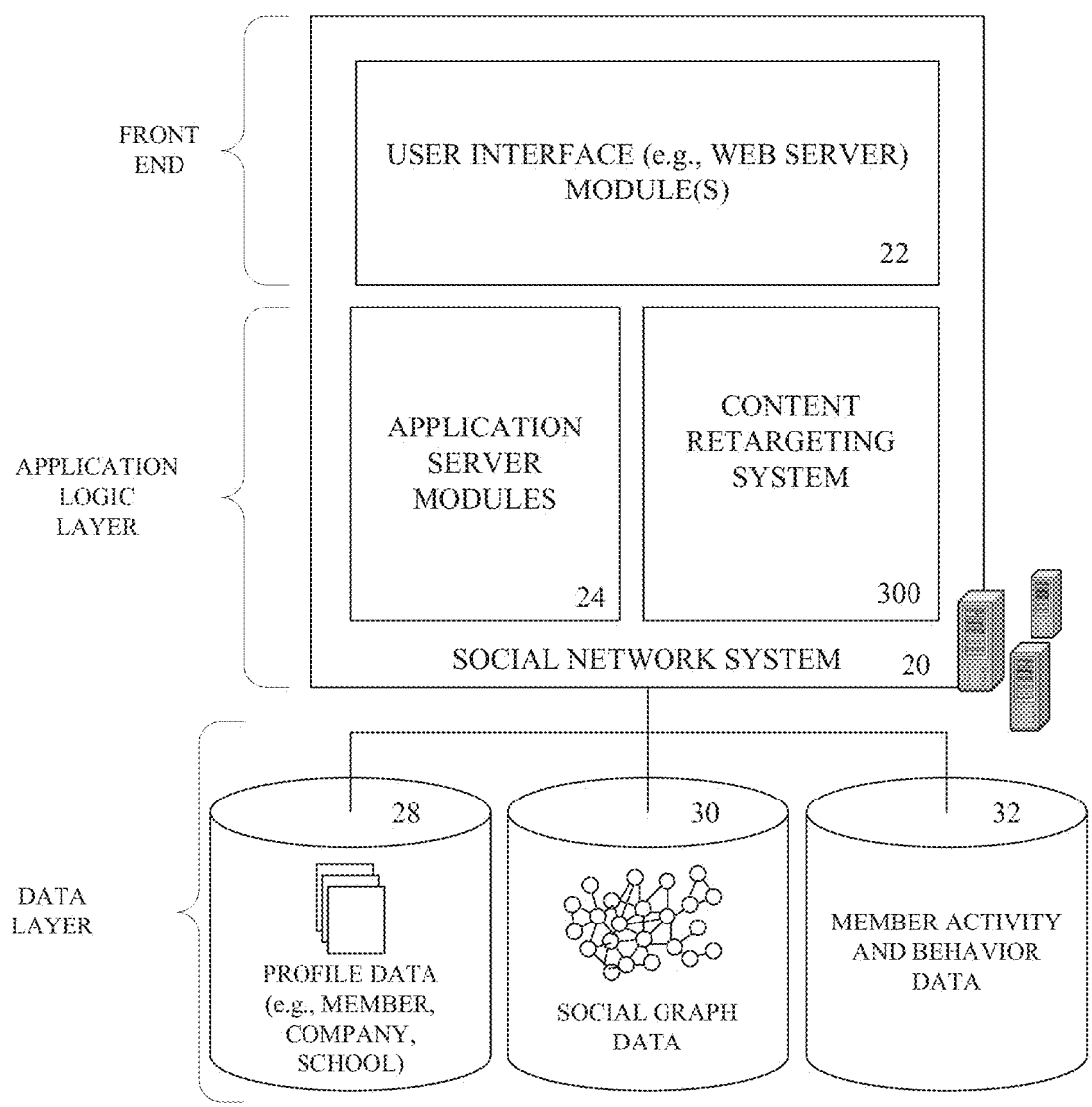
FIG. 2 is a block diagram showing the functional components of a social networking service, consistent with some embodiments of the invention.

FIG. 2 is a block diagram illustrating various components or functional modules of a social network service such as the social network system 20, consistent with some embodiments. As shown in FIG. 2, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 2, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 2 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members behavior (e.g., content viewed, links or member-interest buttons selected, etc.) may be monitored and information concerning the member's activities and behavior may be stored, for example, as indicated in FIG. 2 by the database with reference number 32. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

With some embodiments, the social network system 20 includes what is generally referred to herein as a content retargeting system 300. The content retargeting system 300 is described in more detail below in conjunction with FIG. 3.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 3:
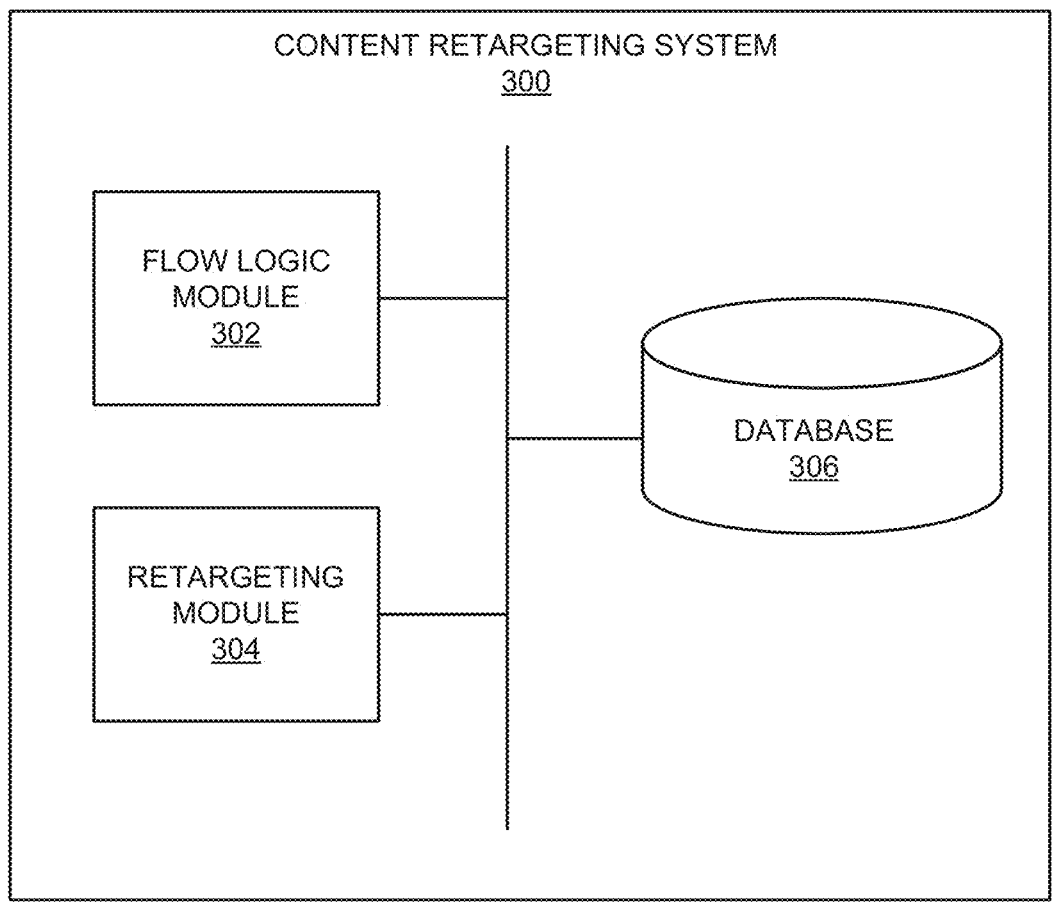
FIG. 3 is a block diagram of an example system, according to various embodiments.

Turning now to FIG. 3, a content retargeting system 300 includes a flow logic module 302, a retargeting module 304, and a database 306. The modules of the content retargeting system 300 may be implemented on or executed by a single device such as a content retargeting device, or on separate devices interconnected via a network. The aforementioned content retargeting device may be, for example, a client machine, desktop computer, mobile device, application server, etc.

According to various exemplary embodiments described in more detail below, the flow logic module 302 of the content retargeting system 300 is configured to receive a user instruction that a content item (e.g., an advertisement) is only to be displayed to a particular user after that user has performed some user action on another content item (e.g., after the user has viewed a particular news article posted in a content feed or content stream). For example, in some embodiments, the flow logic module 302 is configured to receive, via a user interface, a user specification of a first set of content items, a second set of content items, and flow logic information specifying a user trigger action. The flow logic information may include an instruction that a content item in the second set is only to be displayed to a particular user after it is determined that the particular user has performed the user trigger action on a content item in the first set.

Thereafter, the retargeting module 304 of the content retargeting system 300 is configured to determine that a particular user has performed the user trigger action on a content item in the first set, and to display the second content item to the particular user, based on the flow logic information received by the flow logic module 302. Each of the aforementioned modules of the content retargeting system 300 will be described in greater detail below in conjunction with FIG. 4.

According to various exemplary embodiments, the content items referred to herein may be any type of content item, including online content items displayed in or accessible by, for example, a webpage or a use interface of a mobile application. Non-limiting examples of content items include advertisements, news items, blog posts, articles, publications, presentations, slideshows, documents, reviews, pictures, videos, multimedia, webpages, audio files, coupons, promotions, brochures, items posted in a content stream or content feed, notifications, emails, text or instant messages, message boards, bulletin boards, forums, profile pages (e.g., profile pages on a social network service such as LinkedIn®, such as member profile pages, influencer profile pages, company profile pages, group profile pages, etc.), and so on. FIG. 1 illustrates some non-limiting examples of content items, including a news item or article 100 describing the ACME Corporation, and an advertisement or coupon 101 for products pertaining to the ACME Corporation.

According to various exemplary embodiments, a user trigger action may be a view/impression, a like response, a comment, a share, a follow, a click, a conversion (e.g., a user not only clicks on an advertisement but actually completes the transaction pursuant to clicking on the advertisement), a hover response (e.g., placing a cursor over a content item for at least a predetermined period of time, such as 5 seconds), or a hide response (e.g., the user closes or hides the content because they no longer wish to view the content).

Figure 4:
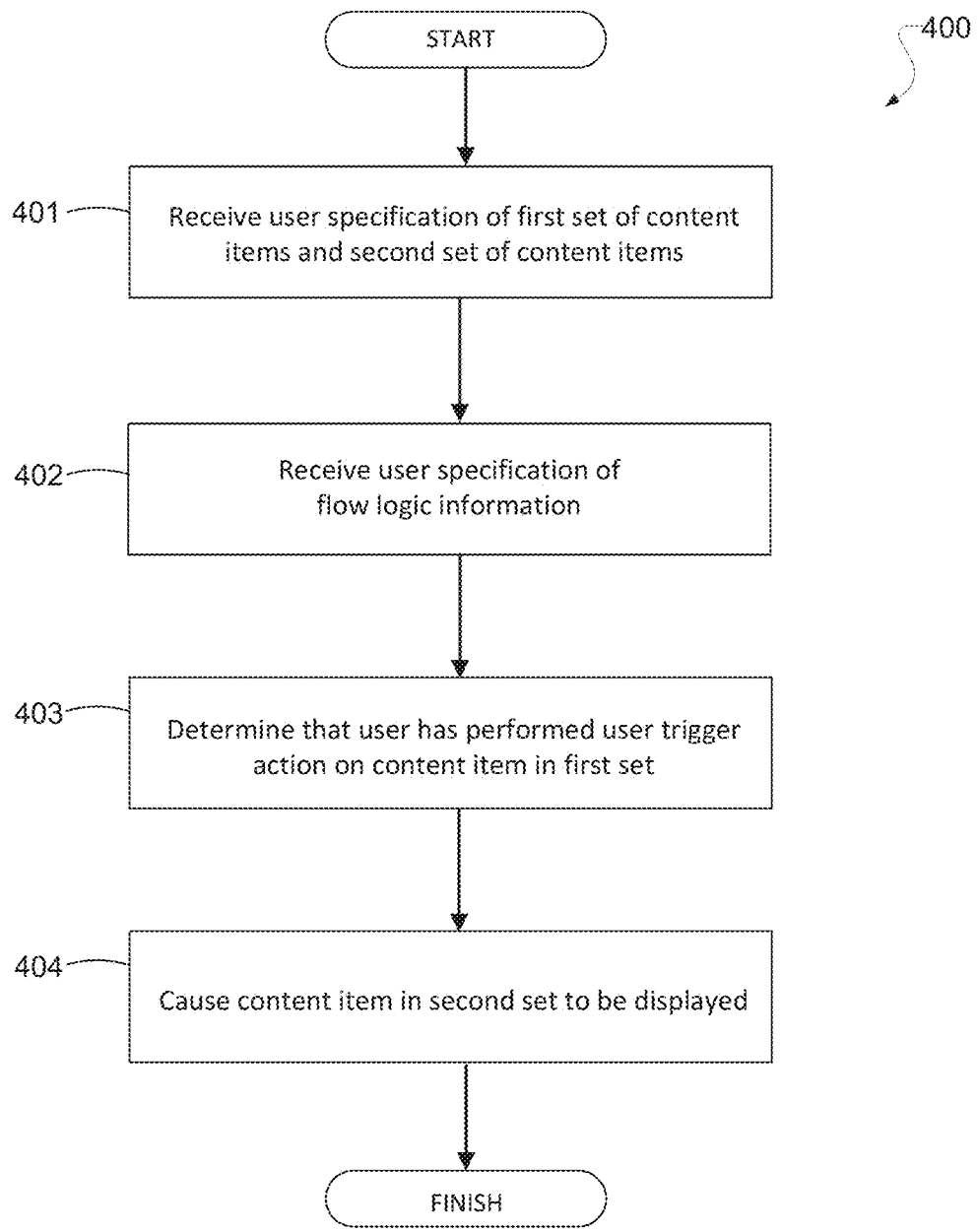
FIG. 4 is a flowchart illustrating an example method, according to various embodiments.
Figure 5:
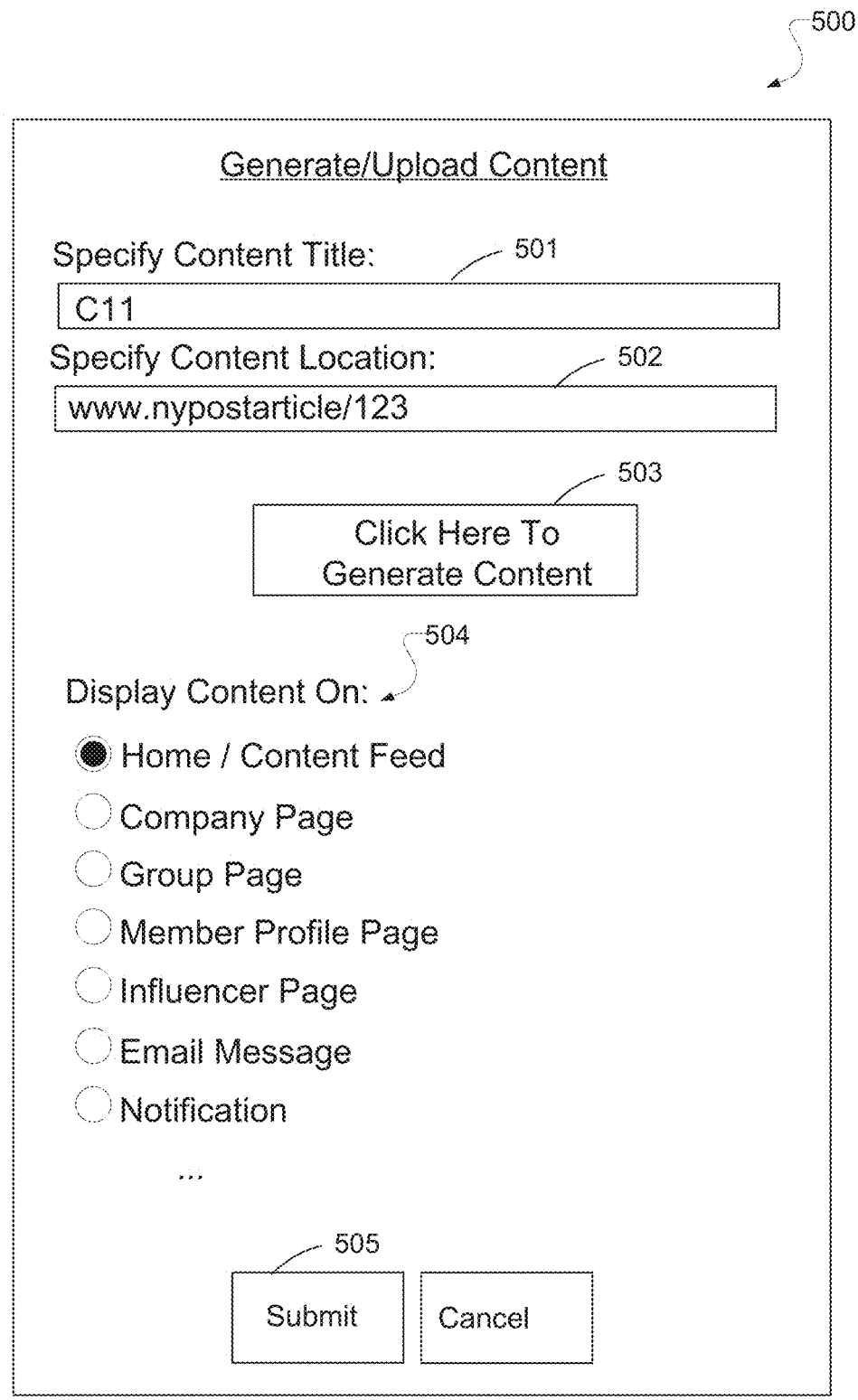
FIG. 5 illustrates an exemplary portion of a user interface for specifying, uploading, or generating content items, according to various embodiments.

FIG. 4 is a flowchart illustrating an example method 400, according to various exemplary embodiments. The method 400 may be performed at least in part by, for example, the content retargeting system 300 illustrated in FIG. 3 (or an apparatus having similar modules, such as a client machine, desktop computer, mobile device, application server, etc.). In operation 401, the flow logic module 302 receives a user specification of a first set of one or more content items and a second set of one or more content items. For example, the flow logic module 302 may first display a user interface to enable an advertiser to upload content items. For example, FIG. 5 illustrates an example of a user interface 500 displayed by the flow logic module 302 that enables an advertiser to specify and upload a content item (such as content items 100 or 101 illustrated in FIG. 747) by specifying a title for the content item (e.g., C11) via user interface portion 501 and by specifying a storage location (e.g., as specified by a Uniform Resource Locator or URL), where the content item may be accessed via user interface portion 502. Alternatively, if the advertiser selects the user interface button 503, the advertiser may be presented with another interface to manually generate the content (e.g., by entering text and/or uploading images to generate an article or advertisement). The advertiser is able to utilize the user interface elements in the user interface portion 504 to select destination locations where the content item is to be displayed (e.g., locations or pages of a social network service such as LinkedIn®, such as a home page, content feed/stream, group page, member profile page, influencer/leader page, email message, notification, and so on).

Figure 6:
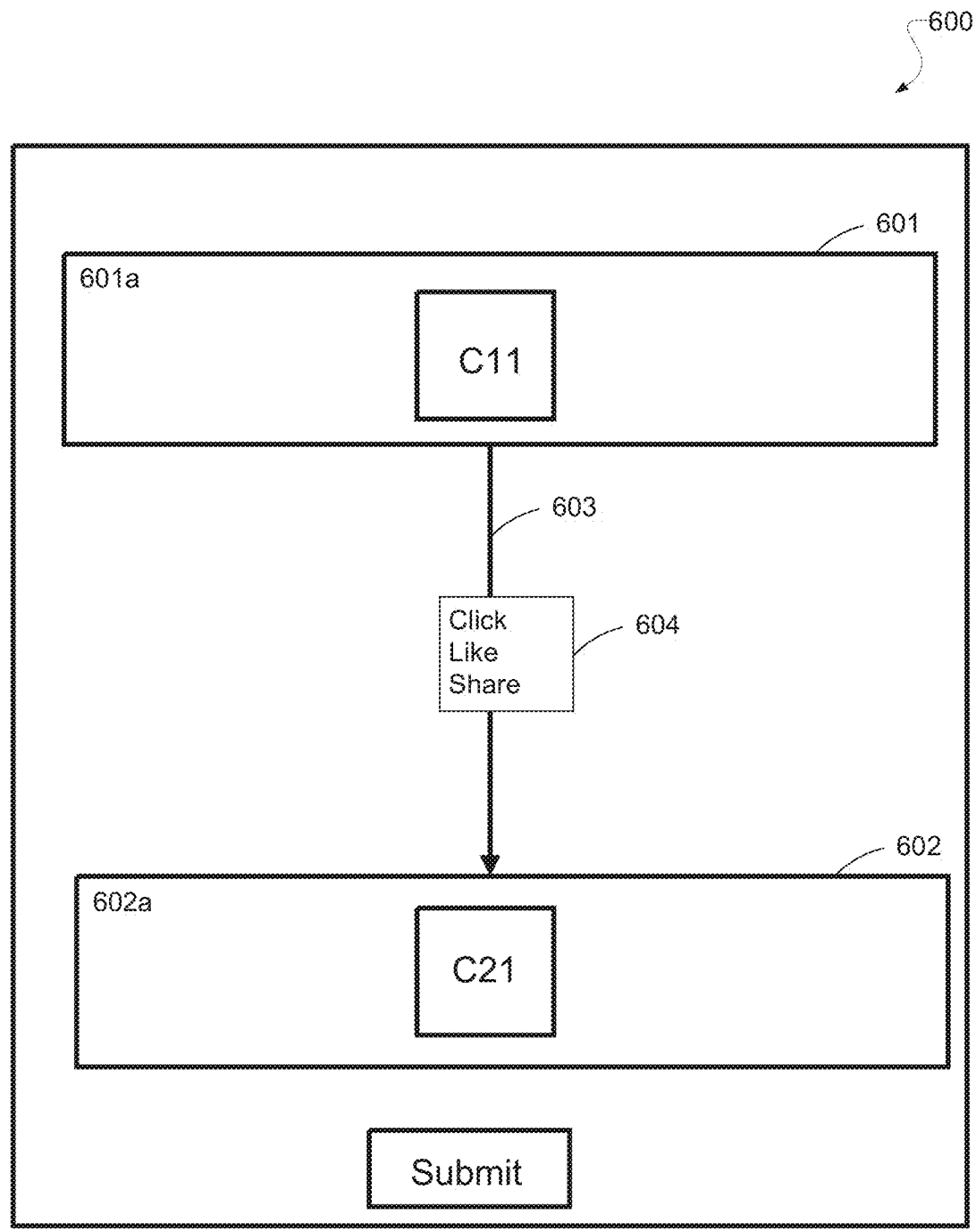
FIG. 6 illustrates an exemplary portion of a user interface for specifying flow logic information, according to various embodiments.

After the advertiser specifies or generates the content item, the advertiser may select the submit button 505 to upload the item, and the flow logic module 302 may display a user interface that allows the advertiser to assign content items to a first set or a second set. As described in more detail below, the first set may include content items that are to be displayed to a user before content items in the second set are displayed to users. FIG. 6 illustrates a non-limiting example of a user interface that may be displayed by the flow logic module 302 to enable the user to assign the content item to a first set or a second set. As described in more detail below, in the example in FIG. 6, the advertiser has utilized the user interface 600 in order to specify that the content item "C21" (e.g., an advertisement) is only to be displayed to a particular user after that the user clicks, likes, or shares the content item "C11" (e.g., a particular news article posted in a content feed or content stream).

For example, the user interface 600 includes icons corresponding to content items, such as the icons labeled "C11" and "C21". The advertiser may have uploaded content items C11 and C12 via the user interface 500 illustrated in FIG. 5, and the user interface 600 may thus display the icons C11 and C12, which may then be manipulated by the advertiser into the first portion 601 or the second portion 602. In some embodiments, an advertiser may move icons corresponding to content items into different portions of the user interface 600, in order to assign the corresponding content items into different content item sets. For example, the user interface 600 includes a first portion 601 corresponding to a first content item set 601a and a second portion 602 that defines a second content item set 602a. Accordingly, placement of an icon in the first portion 601 results in the corresponding content item being assigned to the first set 601a of content items, whereas placement of an icon in the second portion 602 results in the corresponding content item being assigned to the second set 602a of content items. For example, as illustrated in FIG. 6, an advertiser has moved the icon of content item C11 into first portion 601 and the icon of content item C21 into the second portion 602, such that content item C11 is assigned to the first set 601a and content item C21 is assigned to a second set 602a. As described in more detail below, items in the first content item set 601a are displayed to a user before items in the second content item set 602a are displayed to a user. Accordingly, content item C11 will be displayed to a user before content item C21 is displayed to the user. The advertisement may manipulate the content items C11 and C12 by selecting them with a cursor (e.g., via user inputs from manipulation of a computer mouse or computer touchpad), or by selecting or pressing on the icons on a touchscreen display.

Referring back to the method 400 in FIG. 4, in operation 402, the flow logic module 302 receives a user specification of flow logic information. As described herein, flow logic information includes any information describing the order in which content items are to be displayed and/or other conditions upon which content items are to be displayed. For example, in some embodiments, the flow logic information may specify a user trigger action, and an instruction that content items in the second set are only to be displayed to a particular user after it is determined that the particular user has performed the user trigger action on content items in the first set.

According to various exemplary embodiments, the content retargeting system 300 may display a user interface (e.g., the user interface 600 in FIG. 6) via which an advertiser may specify the aforementioned flow logic information. In some embodiments, the advertiser may draw an arrow connector between a first user interface portion (corresponding to a first set) and a second user interface portion (corresponding to a second set), and the advertiser may associate user trigger action information with the arrow connector, in order to specify that a content item in the second set is to be displayed to a particular user after the particular user has performed the user trigger action on a content item in the first set. For example, as illustrated in FIG. 6, the user interface 600 includes an arrow connector 603 extending from the boundary of the first portion 601 and towards the boundary of the second portion 602. This indicates to the flow logic module 302 that items in the first content set 601a are to be displayed before items in the second content set 602a. The advertiser may draw the arrow connector 603 by selecting the boundary of the first portion 601 with a cursor (e.g., via user inputs from manipulation of a computer mouse or computer touchpad) or by selecting the boundary of the first portion 601 directly via a touchscreen, and drawing a line from the boundary of the first portion 601 to the boundary of the second portion 602.

Figure 7:
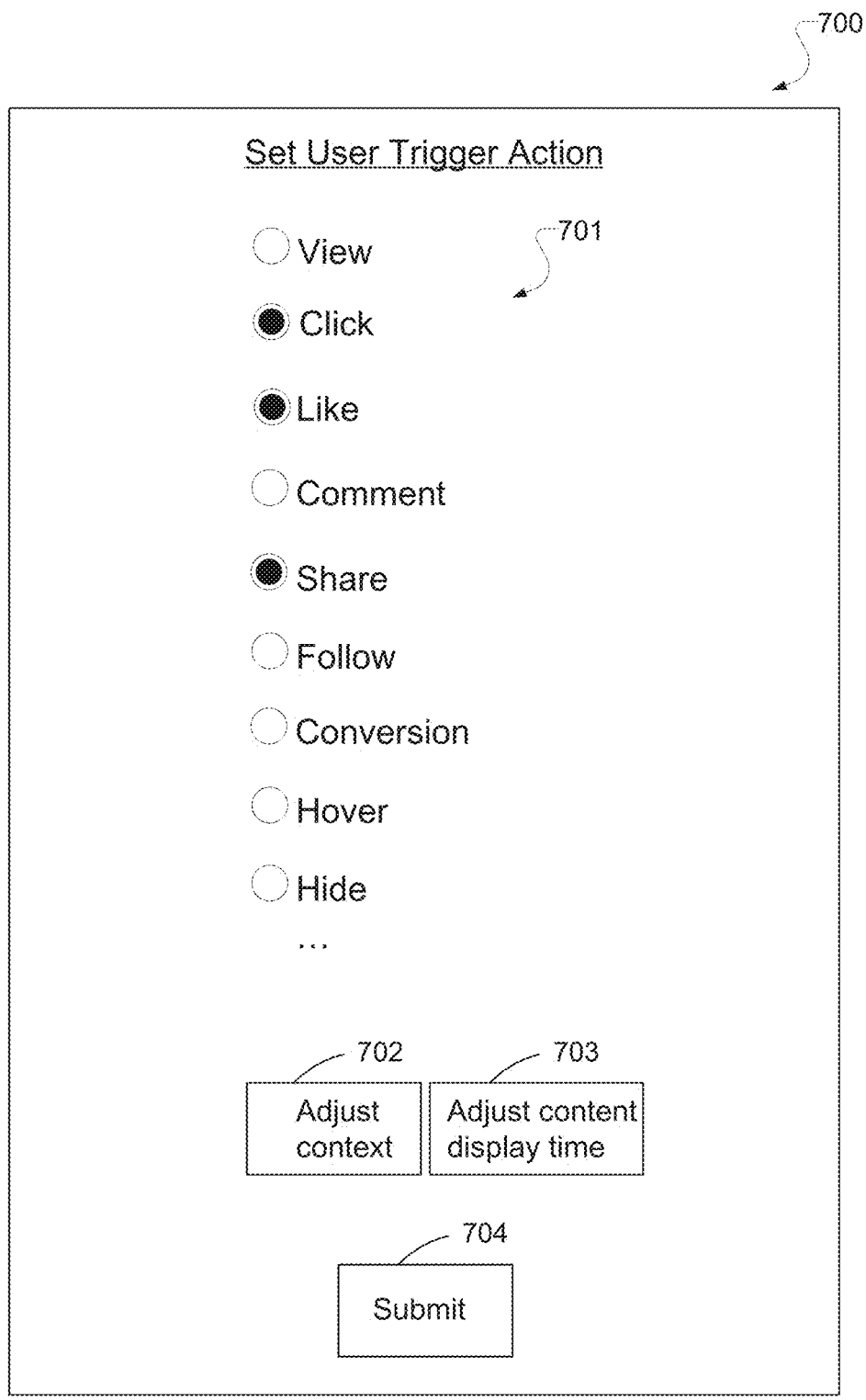
FIG. 7 illustrates an exemplary portion of a user interface for specifying a user trigger action, according to various embodiments.

If the advertiser selects the arrow connector 603 in FIG. 6, the flow logic module 302 may display the user interface 700 illustrated in FIG. 7 that enables the advertiser to specify a user trigger action associated with the arrow connector 603. For example, the advertiser may select one of the radio buttons 701 in order to specify that the user trigger action is a view, a click, a like, a comment, a share, etc. In some embodiments, the advertiser may select the "adjust context button" 702 in FIG. 7 in order to specify further conditions for the user trigger action. For example, the advertiser may specify that the user trigger action (e.g., a click) must be received in a certain temporal context (e.g., a particular time range, a particular date range, a certain time of day, a certain day of the week, a certain day of the month, a certain day of the year, a certain week of the month, a certain week of the year, a certain month of the year, a certain season, and so on). As another example, the advertiser may specify that the user trigger action (e.g., a click) must be received in a certain location context, such as a certain geographic location as determined by an IP address associated with a user device that is utilized to perform the user trigger action, or a geographic location as determined by geolocation information from a mobile device that is utilized to perform the user trigger action. As another example, the advertiser may specify that the user trigger action (e.g., click) must be received from a certain platform such as a mobile device (e.g., smartphone, cell phone, tablet computing device, smart watch, etc.) or from a desktop computer. As another example, the advertiser may specify the quantity of user trigger actions that must be performed with or without reference to a certain period of time, such as 3 views in total, or 3 views in the past month, and so on.

In some embodiments, the advertiser may select the "adjust content display time button" 703 in FIG. 7 in order to specify a time interval during which a content item in the second set should be displayed pursuant to the user performance of the user trigger action on a content in the first set. For example, with reference to FIG. 6, the advertiser may specify that, for example, the content item C21 is to be displayed within seven days of the user performing the user trigger action on the content item C11.

After the advertiser clicks the submit button 704 in FIG. 7, the specified user trigger action is associated with the corresponding arrow connector 603, as indicated by the user trigger action information 604 in FIG. 6. In the example of FIG. 6, the user-specified user trigger actions 604 include a click, a like, or a share, and accordingly the advertiser has specified that the content item C21 is only to be displayed to a particular user after that user clicks, likes, or shares the content item C11.

In some embodiments, after selecting the submit button 604 in FIG. 6, the assignments of content items to the different sets and the specified user trigger actions are stored by the flow logic module 302 for further processing. For example, after the advertiser clicks on the submit button 604, the flow logic module 302 may interpret the items in the user interface 600 (e.g., the positions of the icons of content items, the positions of arrow connectors, user trigger action information, etc.) in order to generate instructions corresponding to the user specified flow logic information. Such instructions may be stored locally at, for example, the database 306 illustrated in FIG. 3, or may be stored remotely at a database, data repository, storage server, etc., that is accessible by the content retargeting system 300 via a network (e.g., the Internet).

Referring back to the method 400 in FIG. 4, in operation 403, the retargeting module 304 determines that a particular user has performed the user trigger action on a content item in the first set. For example, the content retargeting system 300 may access log data identifying a history of various actions performed by each member of a social network service (e.g., LinkedIn®). Such log data may specify that, for example, user A viewed item X at time T1, while user B clicked on item Y at time T2, and so on. The aforementioned log data may be stored locally at, for example, the database 306 illustrated in FIG. 3, or may be stored remotely at a database, data repository, storage server, etc., that is accessible by the content retargeting system 300 via a network (e.g., the Internet). Accordingly, based on such log data, the retargeting module 304 may determine that a particular user has performed a user trigger action (e.g., like, comment, share, etc.) on a content item (e.g., the first content item C11 illustrated in FIG. 6).

In some embodiments, the retargeting module 304 may be responsible for selecting and displaying content items (or causing content items to be displayed) to a user, such as when the content retargeting system 300 corresponds to an advertisement server. In such embodiments, the operation 403 in FIG. 4 may comprise the retargeting module 304 causing the content item C11 to be displayed to users, such as members of a social network service (e.g., LinkedIn®). In other embodiments, a separate system distinct from the content retargeting system 300, such as an advertisement server, may be responsible for selecting and displaying content items (or causing content items to be displayed) to a user. In such embodiments, the operation 403 in FIG. 4 may comprise the retargeting module 304 tracking and/or detecting when content items in the first set are displayed to a user by a distinct system (e.g., an advertisement server).

Referring back to the method 400 in FIG. 4, after determining that the user has performed the user trigger action on a content item in the first set (in operation 403), in operation 404, the retargeting module 304 causes a content item in the second set to be displayed to the particular user, based on the flow logic information that is specified in operation 402. With reference to the example in FIG. 6, after determining that a particular user "John Smith" has performed a user trigger action (e.g., like, comment, share, etc.) on a content item C11, the retargeting module 304 may display the content item C21 to the user "John Smith". If the display settings associated with the content item C21 indicate that this content item is to be displayed in a particular location such as, for example, a content feed (e.g., see FIG. 5), then the retargeting module 304 will display the content item C21 in the particular location.

In some embodiments, the retargeting module 304 may be responsible for selecting and displaying content items (or causing content items to be displayed) to a user, such as when the content retargeting system 300 corresponds to an advertisement server. In such embodiments, the operation 404 in FIG. 4 may comprise the retargeting module 304 causing the content item C21 to be displayed to users that have performed the appropriate user trigger actions on the content item C11. In other embodiments, a separate system distinct from the content retargeting system 300, such as an advertisement server, may be responsible for selecting and displaying content items (or causing content items to be displayed) to a user. In such embodiments, the operation 404 in FIG. 4 may comprise the retargeting module 304 instructing the distinct system (e.g., an advertisement server) to display the content item C21 to users.

In some embodiments, the operation 404 in FIG. 4 may comprise attempting to display the content item C21 to a user, notwithstanding the outcome that the user may not actually view the content item C21. For example, the retargeting module 304 may transmit a notification message to a user (e.g., an email message, a text message, an instant message, an "InMail" notification message for members of the LinkedIn® social network service, etc.), where the message includes a reference link (e.g., a URL) for accessing the content item C21.

According to various exemplary embodiments herein, after the advertiser specifies the first and second content items and the flow logic information, the retargeting module 304 will prevent any content item in the second set (e.g., content item C21) from being displayed to any given user until that user has performed a user action (specified in the user trigger action information 604) on the content item in the first set (e.g., the content item C11). For example, in some embodiments, the retargeting module 304 may be responsible for selecting and displaying content items (or causing content items to be displayed) to a user, such as when the content retargeting system 300 corresponds to an advertisement server. In such embodiments, the retargeting module 304 will prevent the content item C21 from being displayed to the user until after the retargeting module 304 has determined that the user has performed the appropriate user trigger action on the content item C11. In other embodiments, a separate system distinct from the content retargeting system 300, such as an advertisement server, may be responsible for selecting and displaying content items (or causing content items to be displayed) to a user. In such embodiments, the retargeting module 304 may instruct the distinct system (e.g., the advertisement server) to not display the content item C21 to users. After determining that a given user has performed the appropriate user trigger actions on the content item C11, the retargeting module 304 may instruct the distinct system (e.g., the advertisement server) to display the content item C21 to the given user.

Figure 8:
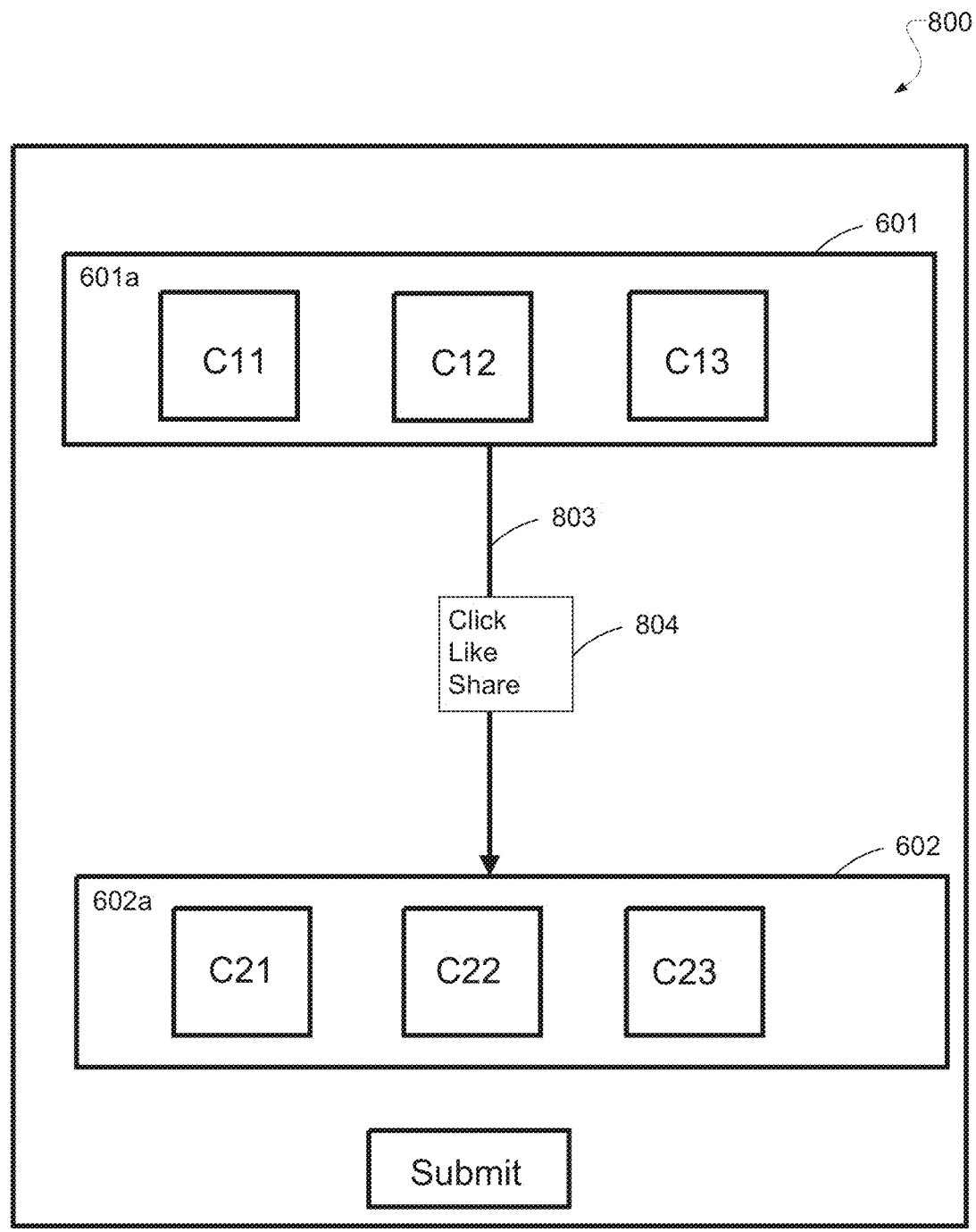
FIG. 8 illustrates an exemplary portion of a user interface for specifying flow logic information, according to various embodiments.

While the example in FIG. 6 illustrates a single content item C11 in the first set 601a and a single content item C21 in the second set 602a, it is understood that the embodiments herein are applicable to multiple content items being included in the first set 601a and/or the second set 602a. In such case, none of the content items in the second set 602a will be displayed to a given user (e.g., the content retargeting system 300 will prevent any of the content items in the second set from being displayed to the given user) until that user performs the appropriate user trigger action on a content item in the first set 601a. For example, FIG. 8 illustrates an exemplary user interface 800 similar to the user interface 600 illustrated in FIG. 6. In the user interface 800, the advertiser has assigned the content items C11, C12, and C13 to the first set 601a, and the advertiser has assigned the content items C21, C22, C23, to the second set 602a. The advertiser may have uploaded content items C11-C23 via the user interface 500 illustrated in FIG. 5, and the user interface 800 may have thus displayed the icons C11-C23, which may then be manipulated by the advertiser into the first portion 601 or the second portion 602, as described in various embodiments above. Similar to the arrow connector 603 in FIG. 6, the arrow connector 803 in FIG. 8 extends from the border of the first portion 601 to the border of the second portion 602 and is associated with user trigger action information 804. Accordingly, once a particular user clicks, likes, or shares any of the content items C11, C12, or C13, the retargeting module 304 will display one of the content items C21, C22, or C23.

Figure 9:
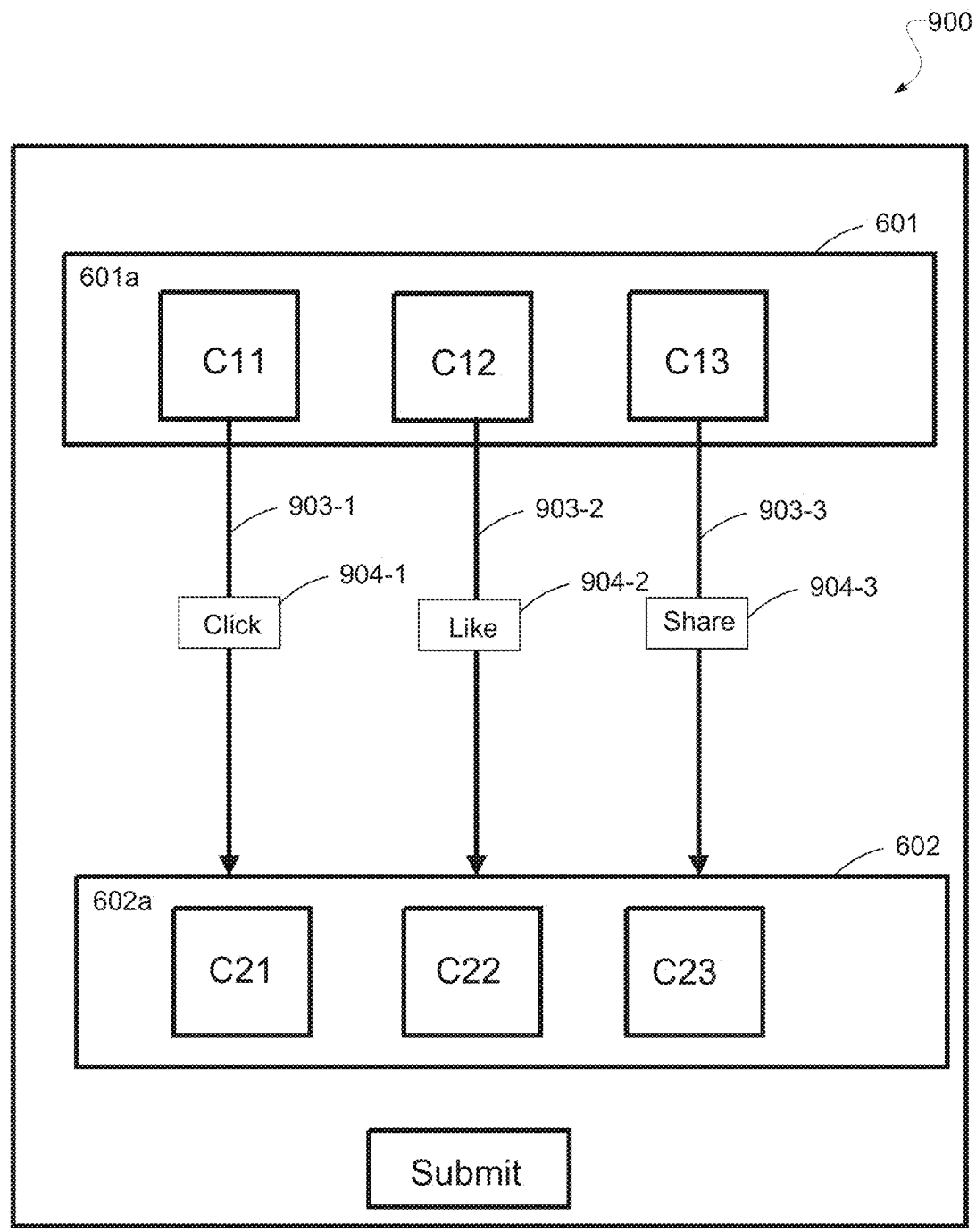
FIG. 9 illustrates an exemplary portion of a user interface for specifying flow logic information, according to various embodiments.

According to various exemplary embodiments, an advertiser may specify that each of the content items in the first set 601a may actually be associated with its own user trigger actions. For example, an advertiser may wish to specify that an advertisement for Acme Corporation should be displayed to a user after the user clicks on a news article about Acme Corporation, or after the user likes a biographical article about the CEO of the Acme Corporation, or after the user shares a viral advertisement video (e.g., YouTube® video) about the Acme Corporation. For example, FIG. 9 illustrates an example of the user interface 900 similar to the user interface 800 illustrated in FIG. 8. While the user interface 800 of FIG. 8 includes a single arrow connector 803 extending from the boundary of the first area 601 to the boundary of the second area 602, the user interface 900 of FIG. 9 includes an arrow connector 903-1 (associated with user trigger action information 904-1) extending directly from the content item icon C11 to the boundary of the second area 602, an arrow connector 903-2 (associated with user trigger action information 904-2) extending directly from the content item icon C12 to the boundary of the second area 602, and an arrow connector 903-3 (associated with user trigger action information 904-3) extending directly from the content item icon C13 to the boundary of the second area 602. The advertiser may draw such arrow connectors as described in various embodiments above, and the advertiser may specify the user trigger information associated with each of the arrow connectors (e.g., via the user interface 700 illustrated in FIG. 7), as described in various embodiments above. Accordingly, in the example of FIG. 9, once a particular user clicks on the content item C11, or the user likes the content item C12, or the user shares the content C13, the retargeting module 304 will display any one of the content items C21, C22, or C23 to the user. In other words, the retargeting module 304 will not display (or will prevent the display of) the content items C21, C22, or C23 to a user until that user clicks on the content item C11, or the user likes the content item C12, or in the user shares the content C13.

Figure 10:
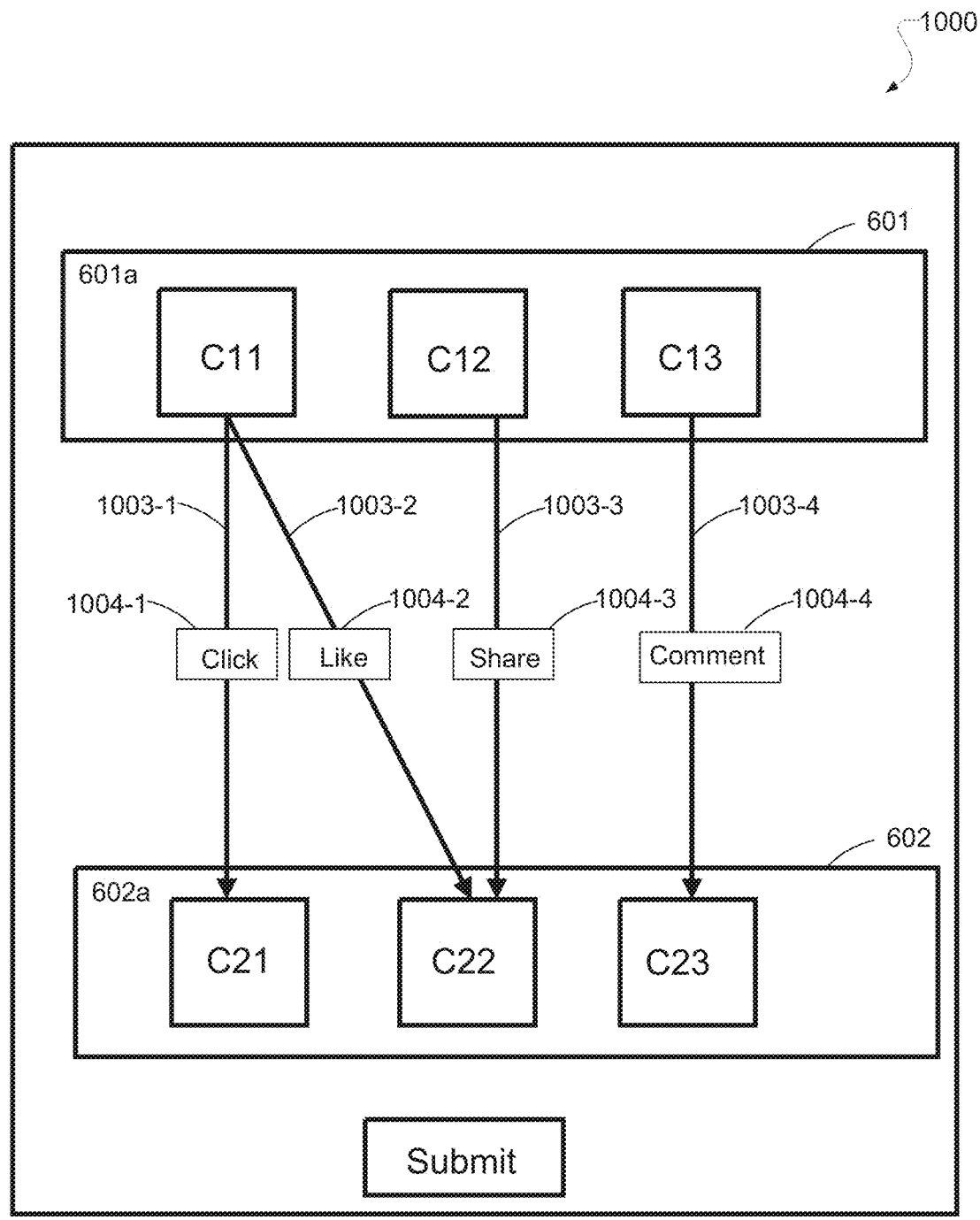
FIG. 10 illustrates an exemplary portion of a user interface for specifying flow logic information, according to various embodiments.

According to various exemplary embodiments, an advertiser may specify that a single content item in the first set 601a of FIG. 8 may actually be associated with multiple user trigger actions. For example, an advertiser may wish to display a first content item to a user, and then later display other different content items to the user, depending on how that the user interacts with the first content item. For example, FIG. 10 illustrates an example of the user interface 1000 similar to the user interface 800 illustrated in FIG. 8. While the user interface 800 of FIG. 8 includes a single arrow connector 803 extending from the boundary of the first area 601 to the boundary of the second area 602, the user interface 1000 of FIG. 10 includes an arrow connector 1003-1 extending directly from the content item icon C11 to the content item icon C21, and the arrow connector 1003-1 is associated with the user trigger information 1004-1 (e.g., a click). At the same time, another arrow connector 1003-2 extends directly from the icon of the content item C11 to the icon of the content item C22, where the arrow connector 1003-2 is associated with the user information 1004-2 (e.g., a like). In other words, the advertiser has specified via the user interface 1000 that if a user clicks on the content item C11, then the content item C21 is to be displayed to the user, but if the user likes the content item C11, then the content item C22 (and not the content item C21) is to be displayed to the user. Likewise, the user interface 1000 includes an arrow connector 1003-3 associate with user trigger action information 1004-3 that specifies that if the user shares the content item C12, then the content item C22 is to be displayed to the user. Further, the user interface 1001 includes an arrow connector 1003-4 associated with user trigger action information 1004-4 that specifies that if the user comments on the content item C13, then the content item C23 is to be displayed to the user. The advertiser may draw such arrow connectors as described in various embodiments above, and the advertiser may specify the user trigger information associated with each of the arrow connectors (e.g., via the user interface 700 illustrated in FIG. 7), as described in various embodiments above. Accordingly, in the example of FIG. 10, the retargeting module 304 will not display (or will prevent the display of) the content item C21 to a user until the user clicks on the content item C11, and the retargeting module 304 will not display (or will prevent the display of) the content item C22 to a user until the user either likes the content item C11 or shares the content item C12, and the retargeting module 304 will not display (or will prevent the display of) the content item C23 to a user until the user comments on the content item C13.

According to various exemplary embodiments, the content retargeting system 300 enables an advertiser to specify a target audience or targeting criteria associated with each of the content items, and the retargeting module 304 will display each content item to the appropriate target audience. In some embodiments, each of the content items will, by default, be available to all users (e.g., all members in the member base of the social network service such as LinkedIn®), unless targeting criteria specifying otherwise is received by the flow logic module 302. For example, with reference to the user interface 800 in FIG. 8, if the advertiser selects on any of the content item icons C11-C23, the flow logic module 302 may display the user interface 1100 in FIG. 11 that allows the advertiser to set the target audience for that content item. As illustrated in FIG. 11, the user interface 1100 enables a user (e.g., advertiser) to specify attributes of a target audience such as age, gender, location, skills, current or previous employer, size of current or previous employer, current or previous position/job, seniority level, current or previous schools, education, interests (e.g., based on preferences, purchase history, viewing history, browsing history, social activity signals, membership in groups on a social network service, companies being followed, groups being followed, influencers being followed, schools or universities being followed, and so on), number of connections, identity of connections, and the like.

Figure 12:
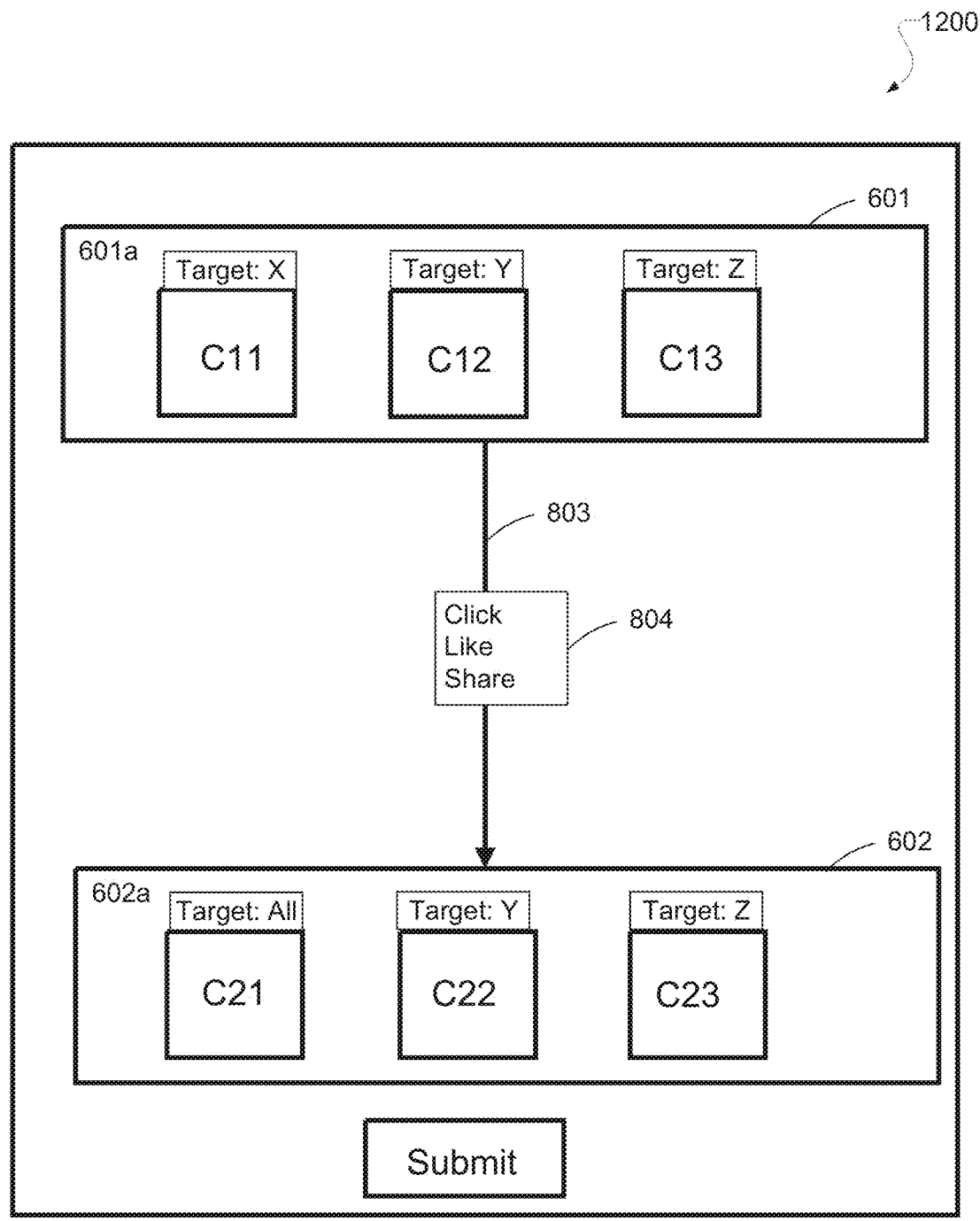
FIG. 12 illustrates an exemplary portion of a user interface for specifying flow logic information, according to various embodiments.

FIG. 12 illustrates an exemplary user interface 1200 similar to the user interface 800 illustrated in FIG. 8. As illustrated in FIG. 12, an advertiser has set target audiences X, Y, and Z for content item C11, C12, and C13, respectively. Similarly, an advertiser has a set target audience of "all" (e.g., the entire member base of a social network service such as LinkedIn®), Y, and Z, for content item C21, C22, and C23, respectively. Accordingly, the retargeting module 304 will only display content item C11 to target audience X, will only display content item C12 to target audience Y, and will only display content item C13 to target audience Z. Moreover, if the retargeting module 304 determines that a user (in target audience X) either clicks, likes, or shares content item C11, then the retargeting module 304 will display a content item from the second set 602a to the user. In this example, the retargeting module 304 will display the content item C21, since this is the only content item in the second set 602a that is targeted at users satisfying criteria X. Similarly, targeting criteria may be specified for content items in the user interface 900 in FIG. 9 and the user interface 1000 in FIG. 10.

Figure 13:
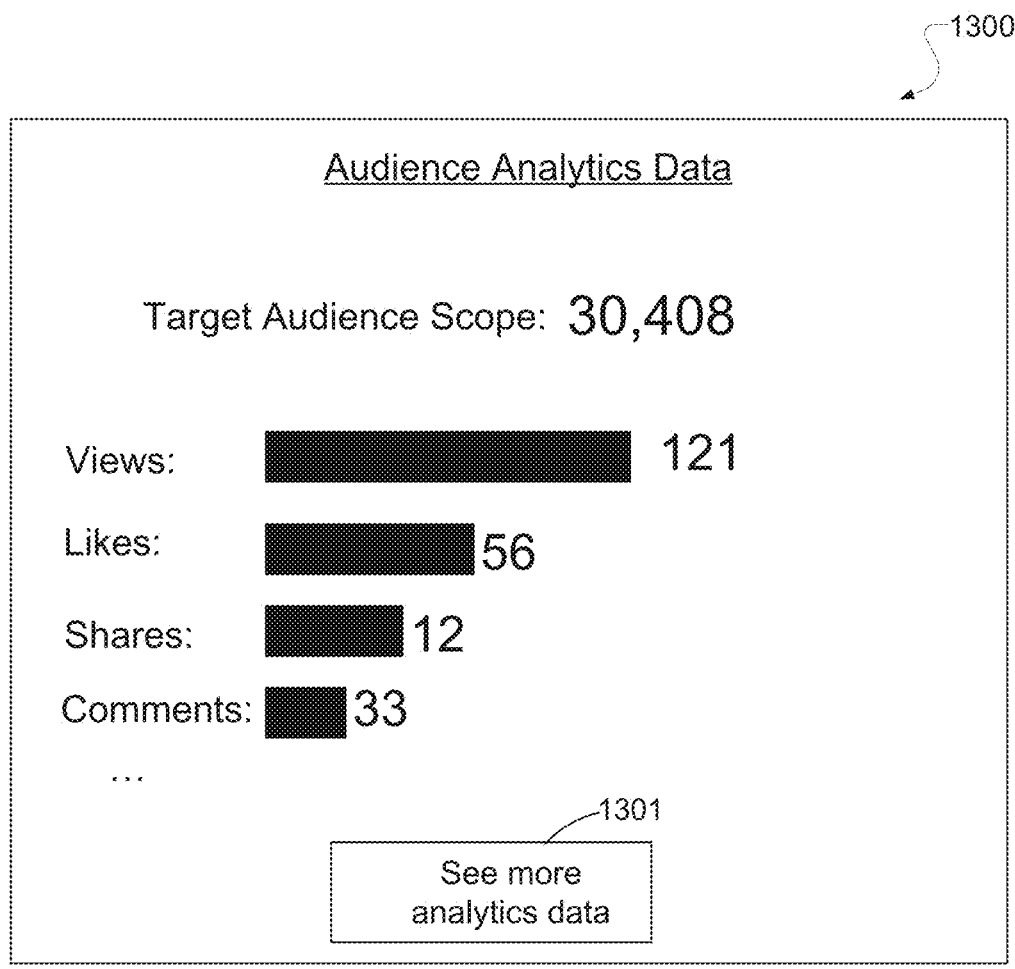
FIG. 13 illustrates an exemplary portion of a user interface for displaying analytics data, according to various embodiments.

In some embodiments, the flow logic module 302 may display analytics information identifying the size of a target audience associated with a content item. For example, if the advertiser selects the content item C11 in FIG. 12, the flow logic module 302 may display the user interface 1300 in FIG. 13, which displays the target audience scope or size of the potential target audience "X" associated with this content item C11. The user interface 1300 also identifies various analytics regarding user actions performed in connection with this content item, such as how many views, likes, shares, comments, etc., that the content item has received. Accordingly, an advertiser can see how many users are performing various potential user trigger actions on a given content item. Moreover, if the advertiser clicks the "See more analytics data" button 1301, the flow logic module 302 may display further analytics information, such as geographic locations where each of the user actions (views, likes, shows, etc.) are being performed, times when each of the user actions are being performed, how many user actions are being performed in a given time period, demographics of users that are performing each of the user actions, platforms where the user actions are being performed (e.g., mobile devices versus desktop devices), and so on.

While various examples above refer to content items in a first set and a second set, it is understood that the embodiments herein are applicable to any number of sets of content items. For example, a marketer may utilize the flow logic module 302 specify a first set of content items (e.g., high-level articles describing Acme Corporation), a second set of content items (e.g., product articles describing product lines of the Acme Corporation), and a third set of content items (e.g., specific advertisements, deals, or coupons, for products from the Acme Corporation). The advertiser may then specify flow logic information indicating that the product articles in the second set are only to be displayed to a user after the high-level company articles in the first set are displayed to the user, and that the advertisements, deals, or coupons in the third set are only to be displayed to a user after the product articles in the second set are displayed to the user, and so on.

Figure 14:
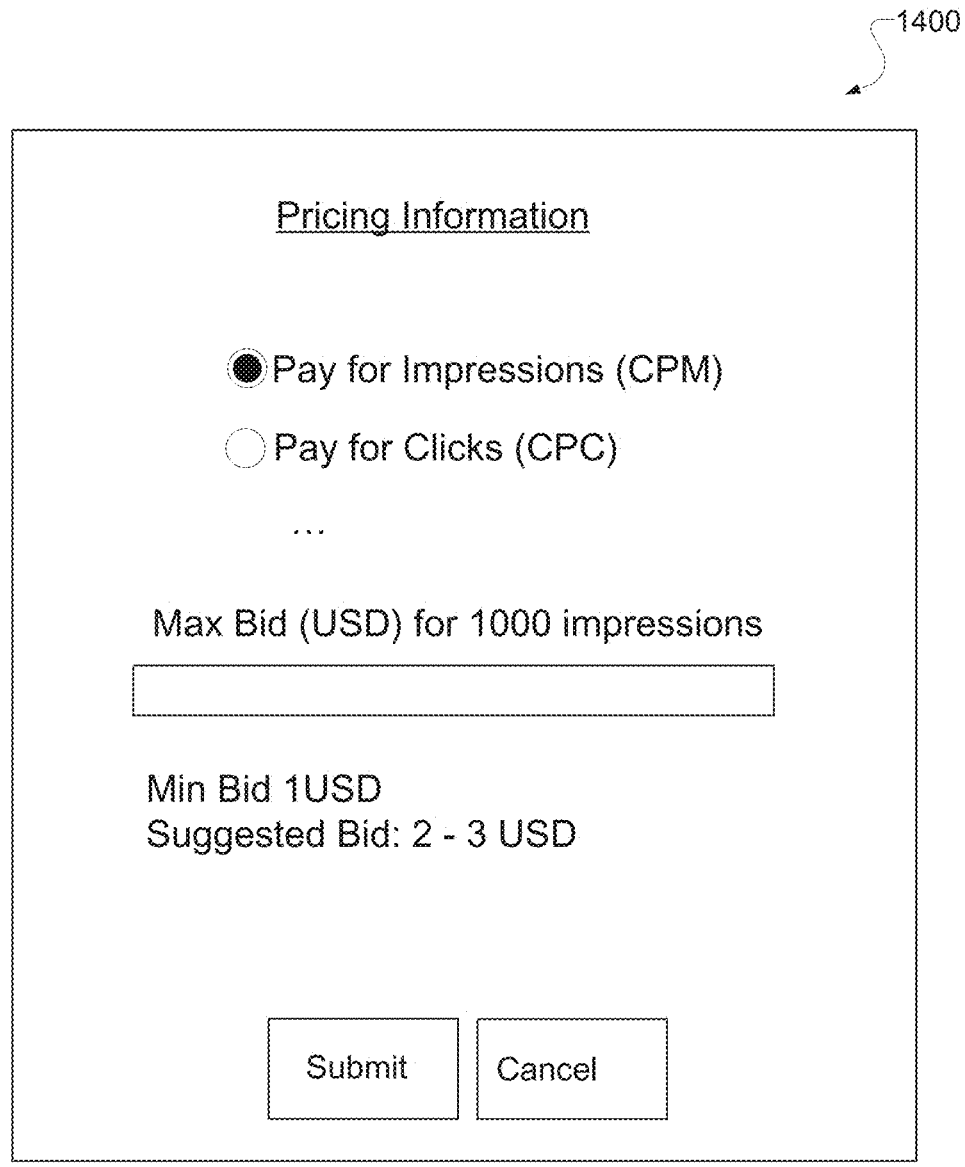
FIG. 14 illustrates an exemplary portion of a user interface for displaying pricing information, according to various embodiments.

According to various exemplary embodiments, the content retargeting system 300 may display a user interface to display pricing information and/or receive user bidding information associated with the display of various content items. For example, the content retargeting system 300 may display the user interface 1400 in FIG. 14 that allows an advertiser to select whether they would like to pay for the display of content items based on a number of impressions, clicks, likes, etc., as well as how much the marketer is willing to bid for a given number of impressions, clicks, likes, etc. The user interface 1400 also displays the minimum bid price and suggested bid price associated with the display of content items. In other embodiments, the display of content may be based on a fixed fee model rather than an auction bidding model, in which case the user interface 1400 may display the fixed price for a given number of impressions, clicks, etc., of a content item.

According to various exemplary embodiments, the content retargeting system 300 may adjust the pricing for the display of content items depending on the content item set to which the content items belong. For example, the retargeting module 304 may charge a given price for the display of content items in the first set, and a greater price for content items in the second set, and an even greater price for content items in the third set, and so on. This may be appropriate because the display of content items in the second set may be more valuable to an advertiser than the display of content items in the first set, since the content items in the second set are being specifically retargeted at users that have performed particular user actions on other content. Accordingly, this highly specific retargeting of content may be extremely valuable to marketers, and the content retargeting system 300 may adjust the pricing for the display of content accordingly. For example, the content retargeting system 300 may adjust the minimum bid or suggested bid for the display of content items (e.g., see FIG. 14), or the content retargeting system 300 may adjust the fixed price for the display of content items.

While various user interfaces are depicted in the figures throughout, it is understood that such user interfaces are merely exemplary, and the content retargeting system described herein may utilize any user interfaces, systems, tools, techniques, and so on, in order to receive a user specification of content items or flow logic information. For example, in some embodiments, the content retargeting system may prompt the user for sets of content items by displaying a query in a user interface, or by outputting an audible query via device speakers. The content retargeting system may then receive a phrase entered/typed by a user into a user interface, or a phrase orally spoken by the user that is detected by a device microphone, where the phrase corresponds to a user specification of sets of content items (e.g. "the first set includes everything in the folder at storage location XYZ"). The content retargeting system may then parse through the phrase in order to identify and access the relevant content items. Similarly, in some embodiments, the content retargeting system may prompt the user for flow logic information by displaying a query in a user interface, or by outputting an audible query via device speakers. The content retargeting system may then receive a phrase entered/typed by a user into a user interface, or a phrase orally spoken by the user that is detected by a device microphone, where the phrase corresponds to a user specification of flow logic information (e.g. "don't show any of the content items in the second set to a member until that member likes one of the content items in the first set"). The content retargeting system may then parse through the phrase in order to identify and/or generate the appropriate rules corresponding to the flow logic information.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
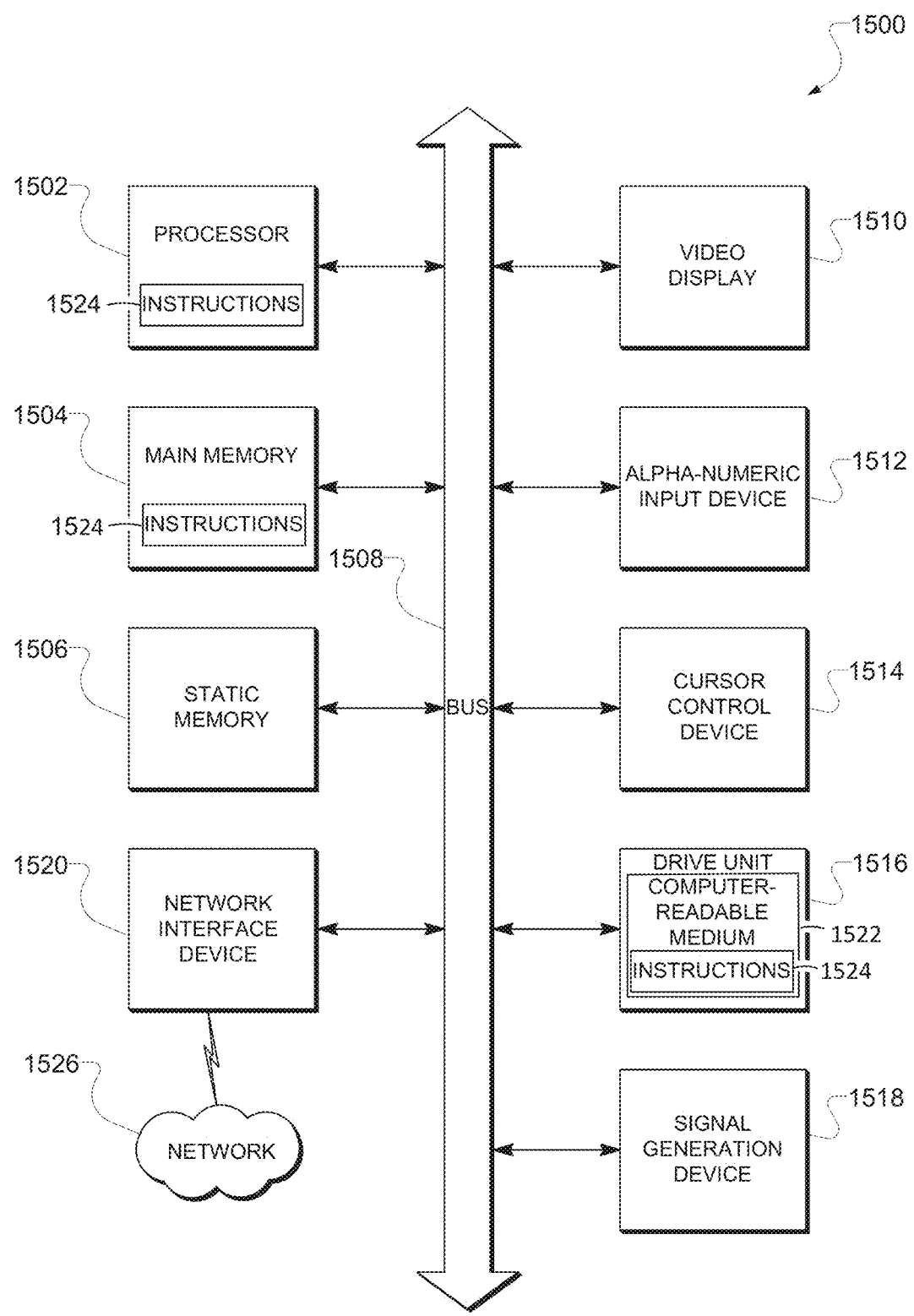
FIG. 15 is a diagrammatic representation of a machine in the example form of a computer system within which a set of instructions, for causing the machine to perform any one or more of the methodologies discussed herein, may be executed.

FIG. 15 is a block diagram of machine in the example form of a computer system 1500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of instructions and data structures (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
displaying, by a computer system having a memory and at least one hardware system, one or more user interfaces identifying a plurality of candidate user trigger actions;
receiving, by the computer system, from a user via the one or more user interfaces:
a specification of a first set of one or more content items and a second set of one or more content items;
a selection of a user trigger action from among the plurality of candidate user trigger actions; and
a specification of a time range associated with the user trigger action;
generating, by the computer system, a user-specified instruction that a second content item is to be displayed to one or more members of an online social network service after the one or more members have performed the user trigger action on a first content item at a time that is within the specified time range, the second content item being in the second set, the first content item being in the first set, the generating of the user-specified instruction being based on a corresponding icon for the first content item being positioned within a first user interface area of a user interface, a corresponding icon for the second content item being positioned within a second user interface area of the user interface, and a visual connector that represents the user trigger action visually connecting the first user interface area to the second user interface area or visually connecting the corresponding icon for the first content item to the corresponding icon for the second content item, the user interface being configured to enable a user to manipulate positioning of the icon for the first content item, positioning of the icon for the second content item, and positioning of the visual connector;
at a first time, storing, by the computer system, the user-specified instruction to be accessed in association with the first content item;
at a second time after the first time, causing, by the computer system, the first content item to be displayed to a member of the online social network service;
determining, by the computer system, that the member has performed the user trigger action on the displayed first content item;
in response to the determination that the member has performed the user trigger action on the displayed first content item at a time that is within the specified time range, accessing, by the computer system, the stored user-specified instruction; and
causing, by the computer system, the second content item to be displayed to the member according to the user-specified instruction.

2. The method of claim 1, wherein at least one of the first content item and the second content item is an online advertisement, an item posted in a content stream, a notification message, a company profile page, a member profile page, a news item, an article, or a webpage.

3. The method of claim 1, wherein the user trigger action associated with the first content item is a view, a like, a comment, a share, a follow, a click, a conversion, a hover response, or a hide response.

4. The method of claim 1, further comprising preventing the second content item from being displayed to the member until the member has performed the user trigger action on the first content item.

5. The method of claim 1, wherein an additional content item in the first set is associated with an additional user trigger action that is distinct from the user trigger action.

6. The method of claim 1, further comprising receiving, from the user, a specification of multiple user trigger actions associated with the first content item, and instructions to display a specific one of the content items in the second set to the one or more members, responsive to the one or more members performing a specific one of the multiple trigger actions on the first content item.

7. The method of claim 1, further comprising receiving, from the user, a specification of a target audience associated with each of the content items in the first set and the second set.

8. The method of claim 7, further comprising causing each of the content items in the first set and the second set to be displayed to a member associated with the corresponding target audience.

9. The method of claim 8, wherein each of the target audiences is specified based on at least one of a location, an age, a gender, interests, education attributes, and professional experience attributes associated with members of the corresponding target audience.

10. The method of claim 8, further comprising:
displaying an analytics user interface identifying a size of the target audience associated with each of the content items in the first set and the second set.

11. The method of claim 1, further comprising:
displaying an analytics user interface identifying demographics of members that have performed the user trigger action associated with each of the content items in the first set.

12. The method of claim 1, wherein each of the content items in the first set includes at least one of a general description of a company, a product campaign, a product line, and a product item, and wherein each of the content items in the second set includes at least one of a specific description of one or more product items and a coupon associated with one or more product items.

13. The method of claim 1, wherein each of the content items in the first set includes at least one of a specific description of one or more product items and a coupon associated with one or more product items, and wherein each of the content items in the second set includes at least one of a general description of a company, a product campaign, a product line, and a product item.

14. The method of claim 1, further comprising receiving, from the user, a specification of an advertiser cost associated with the display of each of the content items in the first set and each of the content items in the second set.

15. The method of claim 14, wherein the cost associated with the display of each of the content items in the second set is greater than the cost associated with the display of each of the content items in the first set.

16. A system comprising:
a processor, and a memory including instructions, which when executed by the processor, cause the processor to:
display one or more user interfaces identifying a plurality of candidate user trigger actions;

receive from a user via the one or more user interfaces:
  a specification of a first set of one or more content items and a second set of one or more content items;
  a selection of a user trigger action from among the plurality of candidate user trigger actions; and
  a specification of a time range associated with the user trigger action;
generating user-specified instruction that a second content item is to be displayed to one or more members of an online social network service after the one or more members have performed the user trigger action on a first content item at a time that is within the specified time range, the second content item being in the second set, the first content item being in the first set, the generating of the user-specified instruction being based on a corresponding icon for the first content item being positioned within a first user interface area of a user interface, a corresponding icon for the second content item being positioned within a second user interface area of the user interface, and a visual connector that represents the user trigger action visually connecting the first user interface area to the second user interface area or visually connecting the corresponding icon for the first content item to the corresponding icon for the second content item, the user interface being configured to enable a user to manipulate positioning of the icon for the first content item, positioning of the icon for the second content item, and positioning of the visual connector;
at a first time, store the user-specified instruction to be accessed in associated with the first content item; and
at a second time after the first time, cause the first content item to be displayed to a member of the online social network service;
determine that the member has performed the user trigger action on the displayed first content item;
in response to the determination that the member has performed the user trigger action on the displayed first content item at a time that is within the specified time range, access the user-specified instruction; and
cause the second content item to be displayed to the member according to the user-specified instruction.

17. The system of claim 16, wherein the processor is further configured to prevent the second content item from being displayed to the member until the member has performed the user trigger action on the first content item.

18. A non-transitory machine-readable storage medium having embodied thereon instructions executable by one or more machines to perform operations comprising:
  displaying one or more user interfaces identifying a plurality of candidate user trigger actions;
  receiving from a user via the one or more user interfaces:
    a specification of a first set of one or more content items and a second set of one or more content items;
    a selection of a user trigger action from among the plurality of candidate user trigger actions; and
    a specification of a time range associated with the user trigger action;
  generating a user-specified instruction that a second content item is to be displayed to one or more members of an online social network service after the one or more members have performed the user trigger action on a first content item at a time that is within the specified time range, the second content item being in the second set, the first content item being in the first set, the generating of the user-specified instruction being based on a corresponding icon for the first content item being positioned within a first user interface area of a user interface, a corresponding icon for the second content item being positioned within a second user interface area of the user interface, and a visual connector that represents the user trigger action visually connecting the first user interface area to the second user interface area or visually connecting the corresponding icon for the first content item to the corresponding icon for the second content item, the user interface being configured to enable a user to manipulate positioning of the icon for the first content item, positioning of the icon for the second content item, and positioning of the visual connector;
  at a first time, storing the user-specified instruction to be accessed in association with the first content item;
  at a second time after the first time, causing the first content item to be displayed to a member of the online social network service;
  determining that the member has performed the user trigger action on the displayed first content item;
  in response to the determination that the member has performed the user trigger action on the displayed first content item at a time that is within the specified time range, accessing the user-specified instruction; and
  causing the second content item to be displayed to the member according to the user-specified instruction.

* * * * *